United States Patent
Duan et al.

(10) Patent No.: US 12,235,195 B1
(45) Date of Patent: Feb. 25, 2025

(54) WATER ENVIRONMENTAL DNA COLLECTION APPARATUS (71) Applicant: Chinese Research Academy of Environmental Science, Beijing (CN)

(72) Inventors: Liang Duan, Beijing (CN); Shilong Li, Beijing (CN); Qiusheng Gao, Beijing (CN); Dongmin Yang, Beijing (CN); Xiangyun Gao, Beijing (CN); Haiya Zhang, Beijing (CN); Zhichao Zhang, Beijing (CN); Tao Ya, Beijing (CN); Yingming Mu, Beijing (CN)

(73) Assignee: Chinese Research Academy of Environmental Science, Beijing (CN)

( * ) Notice: Subject to any disclaimer, the term of this patent is extended or adjusted under 35 U.S.C. 154(b) by 0 days.

(21) Appl. No.: 18/786,990

(22) Filed: Jul. 29, 2024

(51) Int. Cl.
*G01N 1/14* (2006.01)
(52) U.S. Cl.
CPC ..................................... *G01N 1/14* (2013.01)
(58) Field of Classification Search
CPC .. G01N 1/14; G01N 35/1004; G01N 35/1095; G01N 1/08; G01N 21/78; G01N 1/38; G01N 21/05
See application file for complete search history.

(56) References Cited

U.S. PATENT DOCUMENTS

| | | | | |
|---|---|---|---|---|
| 4,327,661 A | * | 5/1982 | Boeckel | B04B 5/0407 118/52 |
| 4,994,188 A | * | 2/1991 | Prince | A61M 1/36 210/636 |
| 5,786,894 A | * | 7/1998 | Shields | G01N 33/343 356/338 |
| 9,107,341 B2 | * | 8/2015 | Martinez | A01C 21/007 |
| 9,573,098 B2 | * | 2/2017 | Lechuga Andrade | B01D 71/48 |

(Continued)

FOREIGN PATENT DOCUMENTS

| | | |
|---|---|---|
| CN | 206095696 U | 4/2017 |
| CN | 108088728 A | 5/2018 |

(Continued)

OTHER PUBLICATIONS

Markus Majaneva et al; Environmental DNA filtration techniques affect recovered biodiversity. Scientific reports, vol. 8. Mar. 16, 2018. pp. 1-11.

*Primary Examiner* — Shogo Sasaki
(74) *Attorney, Agent, or Firm* — Hawaii Patent Services; Nathaniel K. Fedde; Kenton N. Fedde (57) ABSTRACT

A water environmental DNA collection apparatus, including a lower box body and collection components, where a clear water chamber, a motor chamber, a water pump chamber and a power supply chamber are provided in the lower box body, a motor is provided in the motor chamber, a water pump is provided in the water pump chamber, the lower box body is fixedly connected with a first filtering mechanism, the water pump communicates with the first filtering mechanism, a support column is fixedly connected outside the lower box body, and a turntable is fixedly connected with the support column; and a plurality of groups of collection components are provided, each collection component includes a press filter, a cylinder and a bottom shell, a transverse plate is fixedly connected inside the cylinder, the cylinder is divided into a filter pressing chamber and a filtering chamber through the transverse plate.

6 Claims, 3 Drawing Sheets

(56) References Cited

U.S. PATENT DOCUMENTS

| | | | | |
|---|---|---|---|---|
| 12,066,359 | B2 * | 8/2024 | Swanson | B01D 19/00 |
| 2002/0023875 | A1 * | 2/2002 | Lorenz | C11D 3/386 |
| | | | | 210/601 |
| 2011/0033924 | A1 * | 2/2011 | Berry | G01N 1/4077 |
| | | | | 435/325 |
| 2014/0074007 | A1 * | 3/2014 | McNeil | B01J 20/3212 |
| | | | | 604/4.01 |
| 2014/0370492 | A1 * | 12/2014 | Yasuda | B01L 7/52 |
| | | | | 435/286.1 |
| 2015/0301011 | A1 * | 10/2015 | Martinez | A01C 21/007 |
| | | | | 702/2 |
| 2016/0161478 | A1 * | 6/2016 | Sulya | G01N 33/54386 |
| | | | | 435/7.1 |
| 2019/0346472 | A1 * | 11/2019 | Zhang | G01N 33/227 |
| 2020/0393477 | A1 * | 12/2020 | Davey | G01N 35/04 |
| 2021/0208123 | A1 * | 7/2021 | Swanson | B01D 29/112 |
| 2021/0246162 | A1 * | 8/2021 | El Menyawi | C07K 1/36 |
| 2022/0033872 | A1 * | 2/2022 | Magalhães | G01N 1/12 |
| 2022/0074831 | A1 * | 3/2022 | Xu | B01D 69/02 |
| 2022/0178799 | A1 * | 6/2022 | Atencia-Fernandez | |
| | | | | G01N 1/4077 |
| 2022/0387907 | A1 * | 12/2022 | Tilz | B01D 24/105 |
| 2023/0203426 | A1 * | 6/2023 | Stobbe | C12M 37/04 |
| | | | | 435/3 |
| 2024/0269615 | A1 * | 8/2024 | Rivas Lopez | B01D 61/025 |

FOREIGN PATENT DOCUMENTS

| | | |
|---|---|---|
| CN | 111647594 A | 9/2020 |
| CN | 212110721 U | 12/2020 |
| CN | 218901425 U | 4/2023 |
| CN | 219209246 U | 6/2023 |
| JP | H10337429 A | 12/1998 |
| KR | 20230079867 A | 6/2023 |

* cited by examiner

WATER ENVIRONMENTAL DNA COLLECTION APPARATUS

CROSS-REFERENCE TO RELATED APPLICATIONS

This application claims the benefit of priority from China Patent Application No. 2023113332362 filed on Oct. 16, 2023, the contents of which are hereby incorporated by reference in their entirety.

TECHNICAL FIELD

The present invention relates to the field of environmental DNA (deoxyribonucleic acid) collection, and in particular to a water environmental DNA collection apparatus.

BACKGROUND

Environmental DNA (eDNA) refers to the sum of DNA fragments that can be directly extracted from environmental samples (such as water, soil, air and ice cores), and is a mixture of DNA from different species such as microorganisms, animals and plants, not only including intracellular DNA in epidermal cells released by organisms into the environment through skin, urine, feces, mucus, etc., but also including extracellular DNA released into the environment through lysis after cell death. DNA is captured from environmental samples and preserved, extracted, amplified, sequenced and classified to determine the distribution of organisms in the sampled environment.

At present, the main method of collecting eDNA in water is to collect a certain volume of to-be-tested water samples, and then the water samples are taken back to the laboratory, experimenters manually filter the water samples to collect the eDNA in the water samples, and the filtration process is inconvenient to operate. If a plurality of copies of DNA samples are required, the operation needs to be repeated several times, and the working efficiency is relatively low. Therefore, a water environmental DNA collection apparatus is proposed to solve the above problems.

SUMMARY

The objective of the present invention is to provide a water environmental DNA collection apparatus to solve the problems existing in the above-mentioned prior art and facilitate the collection of environmental DNA.

To achieve the above objective, the present invention provides the following solution: the present invention provides a water environmental DNA collection apparatus, including:
  a lower box body, where a clear water chamber, a motor chamber, a water pump chamber and a power supply chamber are provided in the lower box body, a motor is provided in the motor chamber, a water pump is provided in the water pump chamber, the lower box body is fixedly connected with a first filtering mechanism, the water pump communicates with the first filtering mechanism, a support column is fixedly connected outside the lower box body, and a turntable is fixedly connected with the support column; and
  collection components, where a plurality of groups of collection components are provided, each collection component includes a press filter, a cylinder and a bottom shell, a transverse plate is fixedly connected inside the cylinder, the cylinder is divided into a filter pressing chamber and a filtering chamber through the transverse plate, a second filtering mechanism is provided in the bottom shell, the bottom shell is detachably connected with the cylinder and the turntable, a water inlet hole is provided on the bottom shell, the water pump communicates with the water inlet hole through a first flexible pipe, the first flexible pipe is detachably connected with the water inlet hole, the press filter is detachably connected with the cylinder and communicates with the filtering chamber, a filtering membrane is provided in the press filter, an electric telescopic rod is fixedly connected with the support column, and the electric telescopic rod is drivingly connected with the press filter.

Preferably, the press filter includes an inner cylinder, the inner cylinder is detachably connected inside the cylinder, the inner cylinder is located in the filter pressing chamber, a piston is slidably connected inside the inner cylinder, a push-pull rod is fixedly connected with the piston, a first groove is provided on the inner cylinder, the filtering membrane is placed in the first groove, a pressure ring is detachably connected with the first groove, the pressure ring abuts against the filtering membrane, a first through hole is provided on the piston, a first hard pipe is fixedly connected with the first through hole, a first one-way valve is installed on the first hard pipe, the first hard pipe communicates with a second flexible pipe, and the second flexible pipe communicates with the filtering chamber.

Preferably, a plurality of connecting rods are fixedly connected inside the inner cylinder, a positioning ring is fixedly connected with the connecting rods, the push-pull rod is located in the positioning ring and movably provided in the positioning ring, a fixed plate is fixedly connected with the push-pull rod, a first spring is provided between the fixed plate and the positioning ring, the first spring is worn on the push-pull rod, the filter pressing chamber and the filtering chamber are both provided with vents, and the vents are fixedly connected with air pipes.

Preferably, a top block is fixedly connected with the top end of the push-pull rod, the top block is provided with a first slope, a supporting plate is fixedly connected with the support column, a push block is fixedly connected with the output end of the electric telescopic rod, the push block is provided with a second slope, the push block is slidably arranged on the supporting plate, and an avoidance groove is provided on the push block.

Preferably, the second filtering mechanism includes a filtering screen and a filtering cotton, a second groove and a third groove are provided in the bottom shell, the filtering screen and the filtering cotton are both detachably connected inside the second groove, the filtering cotton is located above the filtering screen, the side wall of the third groove is provided with threads, the outer edge of the cylinder is provided with threads, the cylinder is detachably connected with the third groove through the threads, a second through hole is provided on the side wall of the filtering chamber, a second hard pipe is worn in the second through hole, the water inlet end of the second hard pipe is located above the filtering cotton, and the second flexible pipe is fixedly connected with the second hard pipe.

Preferably, the first filtering mechanism includes a filtering box, the filtering box is fixedly connected with the lower box body, an interception net is fixedly connected with the filtering box, a water outlet hole is provided on the filtering box, the water outlet hole communicates with the water pump through a third flexible pipe, the third flexible pipe is detachably connected with the water outlet hole, a rotating shaft is fixedly connected with the output end of the motor, the rotating shaft extends out of the lower box body, the rotating shaft passes through the filtering box and the interception net, a brush is fixedly connected with the rotating shaft, and the brush abuts against the interception net.

Preferably, the turntable is fixedly connected with an installation groove, the bottom shell is detachably connected in the installation groove, a first cavity is provided in the side wall of the installation groove, a third through hole is provided on the side wall of the first cavity, a clamping column is worn in the third through hole and the first cavity, a baffle is fixedly connected with the clamping column, the baffle is in the first cavity, a second spring is sleeved on the clamping column, the second spring is located in the first cavity, one end of the second spring abuts against the baffle, the other end of the second spring abuts against the side wall of the first cavity, a clamping slot is provided on the bottom shell, the clamping column is detachably connected with the clamping slot, and the end of the clamping column that is away from the clamping slot is fixedly connected with a hand-pulled block.

Preferably, a plurality of guide posts are fixedly connected outside the lower box body, a movable plate is slidably connected with the guide posts, a stud is rotationally connected with the lower box body, threaded holes are provided on the movable plate, the stud is worn in the threaded holes and movably disposed in the threaded holes, a turbine is fixedly connected with the stud, a worm is rotationally connected with the lower box body, the turbine is engaged with the worm, a first joint is fixedly connected with the movable plate, the first joint communicates with the first flexible pipe, via holes are provided on the installation groove and the turntable, the water inlet hole is fixedly connected with a second joint, the second joint is inserted into the via holes, and the first joint is detachably connected with the via holes.

Preferably, two vertical plates are fixedly connected outside the lower box body, the worm is rotationally connected with the vertical plates, a plurality of uprights are fixedly connected with the lower box body, a second cavity is provided in the uprights, a fourth through hole is provided on the top wall of the second cavity, a sphere and a third spring are placed in the second cavity, the sphere extends out of the fourth through hole, the sphere abuts against the third spring, a positioning groove is provided on the turntable, and the sphere is clamped in the positioning groove.

Preferably, a plurality of partitions are fixedly connected inside the lower box body, the interior of the lower box body is divided into the clear water chamber, the motor chamber, the water pump chamber and the power supply chamber through the partitions, clean water is placed in the clear water chamber, a power supply is provided in the power supply chamber, the motor and the electric telescopic rod are electrically connected with the power supply, a water adding hole is provided on the side wall of the clear water chamber, a water adding pipe is fixedly connected inside the water adding hole, a second one-way valve is installed on the water adding pipe, a drainage pipe is provided in the clear water chamber, the drainage pipe extends out of the lower box body, the drainage pipe is detachably connected with the third flexible pipe, an upper plate is fixedly connected with the top end of the support column, and a handle is fixedly connected with the upper plate.

The present invention has the following technical effects: in this device, the first filtering mechanism filters the water for the first time, the first filtered water is pumped into the bottom shell through the water pump, the filtering membrane in the press filter is used to filter DNA in the water, the cylinder is used to connect the press filter and the bottom shell, the second filtering mechanism in the bottom shell filters the water for the second time, the second filtered water is used to extract the DNA in the water, the electric telescopic rod drives the press filter to move and is used for sucking and filter-pressing the second filter water, a plurality of groups of collection components are provided, after using one group, the turntable can be rotated to continue using another group, and the used collection components can also be removed from the turntable. The present invention can reduce manual operations when collecting environmental DNA, can collect a plurality of samples at the same time, and is more convenient to use.

BRIEF DESCRIPTION OF DRAWINGS

To better clarify the embodiments of the present invention or the technical solution in the prior art, the drawings required to illustrate the embodiments will be simply described below. It is apparent that the drawings described below merely illustrate some embodiments of the present invention. Those of ordinary skill in the art can obtain other drawings without contributing creative labor on the basis of those drawings.

Where, 1. Lower box body; 2. Clear water chamber; 3. Motor chamber; 4. Motor; 5. Water pump; 6. Support column; 7. Turntable; 8. Cylinder; 9. Bottom shell; 10. Transverse plate; 11. Filter pressing chamber; 12. Filtering chamber; 13. Water inlet hole; 14. The first flexible pipe; 15. Filtering membrane; 16. Electric telescopic rod; 17. Inner cylinder; 18. Piston; 19. Push-pull rod; 20. Pressure ring; 21. The first hard pipe; 22. Connecting rod; 23. Positioning ring; 24. Fixed plate; 25. The first spring; 26. Air pipe; 27. Top block; 28. Supporting plate; 29. Push block; 30. Filtering screen; 31. Filtering cotton; 32. The second hard pipe; 33. The second flexible pipe; 34. Filtering box; 35. Interception net; 36. The third flexible pipe; 37. Rotating shaft; 38. Brush; 39. Installation groove; 40. The first cavity; 41. Clamping column; 42. Baffle; 43. The second spring; 44. Hand-pulled block; 45. Guide post; 46. Movable plate; 47. Stud; 48. Turbine; 49. Worm; 50. The first joint; 51. Via hole; 52. Vertical plate; 53. Upright; 54. Sphere; 55. The third spring; 56. Partition; 57. Power supply; 58. Water adding pipe; 59. Drainage pipe; 60. Upper plate; 61. The first one-way valve.

DETAILED DESCRIPTION OF EMBODIMENTS

The technical solution in the embodiments of the present invention is clearly and completely elaborated below in combination with the drawings in the embodiments of the present invention. It is apparent that the described embodiments are only a part of the embodiments of the present invention but not all. Based on the embodiments of the present invention, all the other embodiments obtained by those of ordinary skill in the art on the premise of not contributing creative effort should belong to the protection scope of the present invention.

In order to make the above purposes, features and advantages of the present invention more obvious and understandable, the present invention will be further described in detail below in combination with the drawings and specific implementations.

Referring to FIGS. 1-5, the present invention provides a collection device for water environment DNA, including:

a lower box body 1, where a clear water chamber 2, a motor chamber 3, a water pump chamber and a power supply chamber are provided in the lower box body 1, a motor 4 is provided in the motor chamber 3, a water pump 5 is provided in the water pump chamber, the lower box body 1 is fixedly connected with a first filtering mechanism, the water pump 5 communicates with the first filtering mechanism, a support column 6 is fixedly connected outside the lower box body 1, and a turntable 7 is fixedly connected with the support column 6; and collection components, where a plurality of groups of collection components are provided, each collection component includes a press filter, a cylinder 8 and a bottom shell 9, a transverse plate 10 is fixedly connected inside the cylinder 8, the cylinder 8 is divided into a filter pressing chamber 11 and a filtering chamber 12 through the transverse plate 10, a second filtering mechanism is provided in the bottom shell 9, the bottom shell 9 is detachably connected with the cylinder 8 and the turntable 7, a water inlet hole 13 is provided on the bottom shell 9, the water pump 5 communicates with the water inlet hole 13 through a first flexible pipe 14, the first flexible pipe 14 is detachably connected with the water inlet hole 13, the press filter is detachably connected with the cylinder 8 and communicates with the filtering chamber 12, a filtering membrane 15 is provided in the press filter, an electric telescopic rod 16 is fixedly connected with the support column 6, and the electric telescopic rod 16 is drivingly connected with the press filter.

Figure 1:
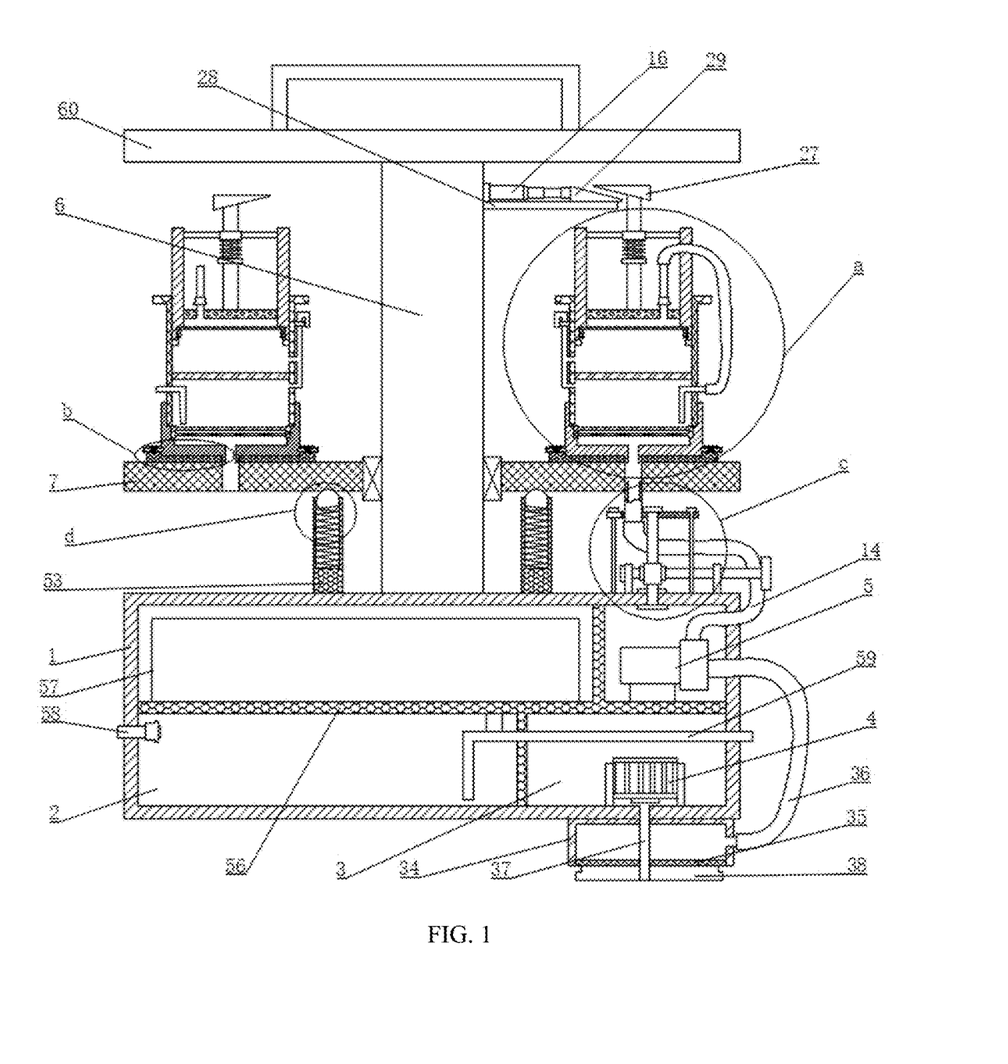
FIG. 1 is a schematic structural diagram of a water environmental DNA collection apparatus in the present invention.

The first filtering mechanism filters the water for the first time, the first filtered water is pumped into the bottom shell 9 through the water pump 5, the filtering membrane 15 in the press filter is used to filter DNA in the water, the cylinder 8 is used to connect the press filter and the bottom shell 9, the second filtering mechanism in the bottom shell 9 filters the water for the second time, the second filtered water is used to extract the DNA in the water, the electric telescopic rod 16 drives the press filter to move and is used for sucking and filter-pressing the second filter water, a plurality of groups of collection components are provided, after using one group, the turntable 7 can be rotated to continue using another group, and the used collection components can also be removed from the turntable 7.

Figure 2:
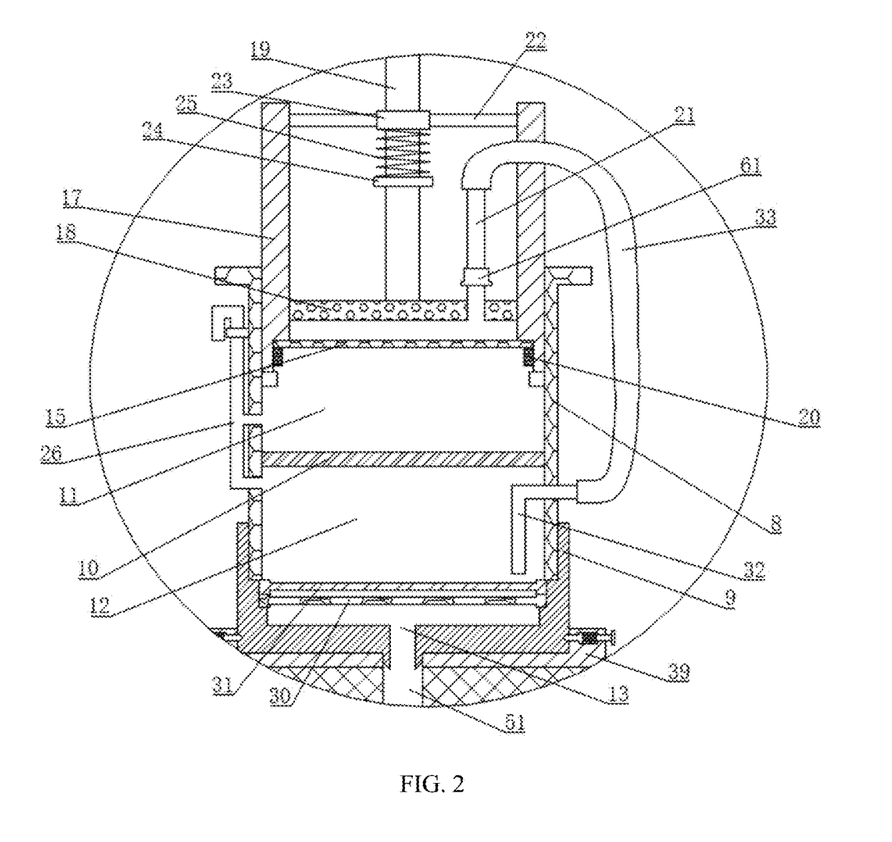
FIG. 2 is a partial enlarged view of a in FIG. 1.

In a further optimized solution, the press filter includes an inner cylinder 17, the inner cylinder 17 is detachably connected inside the cylinder 8, the inner cylinder 17 is located in the filter pressing chamber 11, a piston 18 is slidably connected inside the inner cylinder 17, a push-pull rod 19 is fixedly connected with the piston 18, a first groove is provided on the inner cylinder 17, the filtering membrane 15 is placed in the first groove, a pressure ring 20 is detachably connected with the first groove, the pressure ring 20 abuts against the filtering membrane 15, a first through hole is provided on the piston 18, a first hard pipe 21 is fixedly connected with the first through hole, a first one-way valve 61 is installed on the first hard pipe 21, the first hard pipe 21 communicates with a second flexible pipe 33, and the second flexible pipe 33 communicates with the filtering chamber 12.

The inner cylinder 17 is connected with the cylinder 8 through threads, making connection and disassembly more convenient, the push-pull rod 19 is used to drive the piston 18 to move, the pressure ring 20 is used to press the filtering membrane 15 and connected with the first groove through threads, the first hard pipe 21 is detachably connected with the second flexible pipe 33, the electric telescopic rod 16 drives the push-pull rod 19 to move, when the push-pull rod 19 rises, the piston 18 rises, the gap between the piston 18 and the filtering membrane 15 becomes larger, thus sucking the second filtered water, when the push-pull rod 19 moves down, the water inside will be squeezed, and at the same time, the first one-way valve 61 can prevent the water from flowing out, after the use of the filtering membrane 15 is completed, the pressure ring 20 can be removed, and then the filtering membrane 15 is removed.

In a further optimized solution, a plurality of connecting rods 22 are fixedly connected inside the inner cylinder 17, a positioning ring 23 is fixedly connected with the connecting rods 22, the push-pull rod 19 is located in the positioning ring 23 and movably provided in the positioning ring 23, a fixed plate 24 is fixedly connected with the push-pull rod 19, a first spring 25 is provided between the fixed plate 24 and the positioning ring 23, the first spring 25 is worn on the push-pull rod 19, the filter pressing chamber 11 and the filtering chamber 12 are both provided with vents, and the vents are fixedly connected with air pipes 26.

The positioning ring 23 is used to stabilize the push-pull rod 19, when the electric telescopic rod 16 drives the push-pull rod 19 to move up, the fixed plate 24 also moves up, which will compress the first spring 25, when the electric telescopic rod 16 leaves the push-pull rod 19, the fixed plate 24 drives the push-pull rod 19 to move down under the action of the first spring 25, thus squeezing the sucked water and speeding up the filtration of water by the filtering membrane 15, and the vents facilitate the discharge of the air in the filter pressing chamber 11 and the filtering chamber 12, which is convenient for water entry and outflow.

In a further optimized solution, a top block 27 is fixedly connected with the top end of the push-pull rod 19, the top block 27 is provided with a first slope, a supporting plate 28 is fixedly connected with the support column 6, a push block 29 is fixedly connected with the output end of the electric telescopic rod 16, the push block 29 is provided with a second slope, the push block 29 is slidably arranged on the supporting plate 28, and an avoidance groove is provided on the push block 29.

The electric telescopic rod 16 drives the push block 29 to move, when the push block 29 is in contact with the top block 27, the second slope of the push block 29 will be in contact the first slope of the push block 27, the top block 27 will be jacked up as the push block 29 moves, thus driving the push-pull rod 19 to move up, and the purpose of the avoidance groove is to avoid the push-pull rod 19 and prevent the movement of the push block 29 from being limited.

Figure 3:
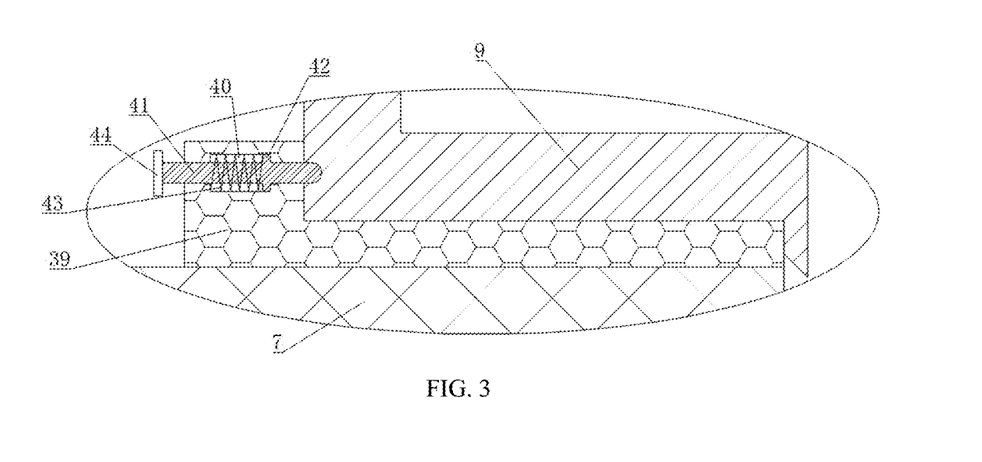
FIG. 3 is a partial enlarged view of b in FIG. 1.

In a further optimized solution, the second filtering mechanism includes a filtering screen 30 and a filtering cotton 31, a second groove and a third groove are provided in the bottom shell 9, the filtering screen 30 and the filtering cotton 31 are both detachably connected inside the second groove, the filtering cotton 31 is located above the filtering screen 30, the side wall of the third groove is provided with threads, the outer edge of the cylinder 8 is provided with threads, the cylinder 8 is detachably connected with the third groove through the threads, a second through hole is provided on the side wall of the filtering chamber 12, a second hard pipe 32 is worn in the second through hole, the water inlet end of the second hard pipe 32 is located above the filtering cotton 31, and the second flexible pipe 33 is fixedly connected with the second hard pipe 32.

The filtering screen 30 and the filtering cotton 31 filter the water sample for the second time to prevent impurities in the water from affecting the collection of DNA, the filtering screen 30 and the filtering cotton 31 are clamped in the second groove to facilitate the replacement of the filtering screen 30 and the filtering cotton 31, the cylinder 8 is connected with the bottom shell 9 through threads, making installation and disassembly more convenient, and the second hard pipe 32 is connected with the second flexible pipe 33, facilitating the connection and disassembly of the second flexible pipe 33.

In a further optimized solution, the first filtering mechanism includes a filtering box 34, the filtering box 34 is fixedly connected with the lower box body 1, an interception net 35 is fixedly connected with the filtering box 34, a water outlet hole is provided on the filtering box 34, the water outlet hole communicates with the water pump 5 through a third flexible pipe 36, the third flexible pipe 36 is detachably connected with the water outlet hole, a rotating shaft 37 is fixedly connected with the output end of the motor 4, the rotating shaft 37 extends out of the lower box body 1, the rotating shaft 37 passes through the filtering box 34 and the interception net 35, a brush 38 is fixedly connected with the rotating shaft 37, and the brush 38 abuts against the interception net 35.

The interception net 35 is used to intercept larger impurities, the third flexible pipe 36 is used to connect the filtering box 34 and the water pump 5, the motor 4 drives the rotating shaft 37 to rotate, the rotating shaft 37 drives the brush 38 to rotate, and the brush 38 can wash debris on the interception net 35, to prevent blocking the interception net 35.

Figure 4:
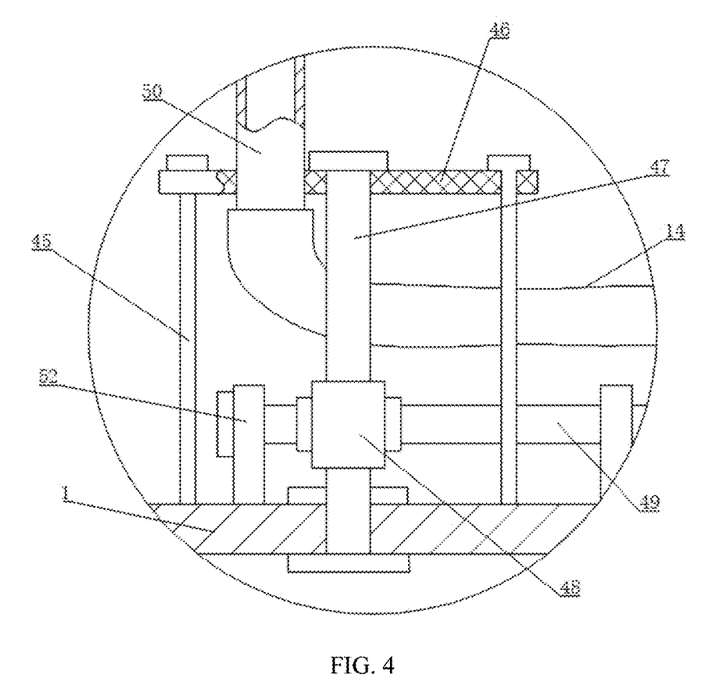
FIG. 4 is a partial enlarged view of c in FIG. 1.

In a further optimized solution, the turntable 7 is fixedly connected with an installation groove 39, the bottom shell 9 is detachably connected in the installation groove 39, a first cavity 40 is provided in the side wall of the installation groove 39, a third through hole is provided on the side wall of the first cavity 40, a clamping column 41 is worn in the third through hole and the first cavity 40, a baffle 42 is fixedly connected with the clamping column 41, the baffle 42 is in the first cavity 40, a second spring 43 is sleeved on the clamping column 41, the second spring 43 is located in the first cavity 40, one end of the second spring 43 abuts against the baffle 42, the other end of the second spring 43 abuts against the side wall of the first cavity 40, a clamping slot is provided on the bottom shell 9, the clamping column 41 is detachably connected with the clamping slot, and the end of the clamping column 41 that is away from the clamping slot is fixedly connected with a hand-pulled block 44.

The bottom shell 9 is detachably connected inside the installation groove 39, when installing the bottom shell 9, the hand-pulled block 44 is pulled outward, the hand-pulled block 44 drives the clamping column 41 to move, when the clamping column 41 completely enters the third through hole, the bottom shell 9 can be placed in the installation groove 39, when the clamping column 41 moves, the baffle 42 will be driven to move, the movement of the baffle 42 will compress the second spring 43, and after releasing the hand-pulled block 44, the end head of the clamping column 41 will enter into the clamping groove under the action of the second spring 43, thereby clamping the bottom shell 9.

Figure 5:
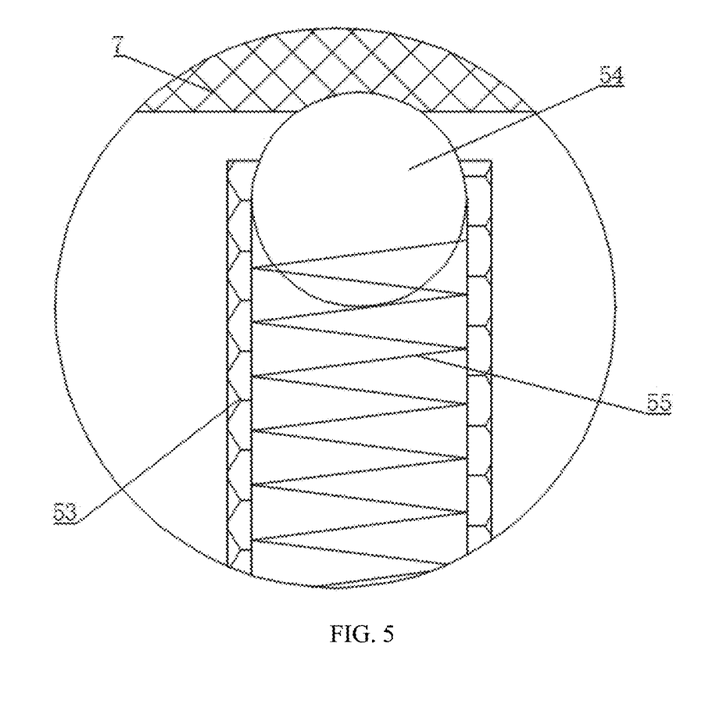
FIG. 5 is a partial enlarged view of d in FIG. 1.

In a further optimized solution, a plurality of guide posts 45 are fixedly connected outside the lower box body 1, a movable plate 46 is slidably connected with the guide posts 45, a stud 47 is rotationally connected with the lower box body 1, threaded holes are provided on the movable plate 46, the stud 47 is worn in the threaded holes and movably disposed in the threaded holes, a turbine 48 is fixedly connected with the stud 47, a worm 49 is rotationally connected with the lower box body 1, the turbine 48 is engaged with the worm 49, a first joint 50 is fixedly connected with the movable plate 46, the first joint 50 communicates with the first flexible pipe 14, via holes 51 are provided on the installation groove 39 and the turntable 7, the water inlet hole 13 is fixedly connected with a second joint, the second joint is inserted into the via holes 51, the first joint 50 is detachably connected with the via holes 51, and the top ends of the guide posts 45 are fixedly connected with a stopping block.

When the bottom shell 9 is put into the installation groove 39, the second joint will be inserted into the via holes 51, the movable plate 46 drives the first joint 50 to move, the first joint 50 is used to connect with the via holes 51, during connection, the worm 49 is rotated, the worm 49 drives the turbine 48 to rotate, the turbine 48 drives the stud 47 to rotate, the stud 47 drives the movable plate 46 to move up and down, the stud 47 is rotationally connected with the lower box body 1, when the stud 47 rotates, the stud 47 does not move on the lower box body 1, and when rotating the turntable 7, the second joint needs to be disassembled from the via holes 51, and then the worm 49 is rotated in an opposite direction.

In a further optimized solution, two vertical plates 52 are fixedly connected outside the lower box body 1, the worm 49 is rotationally connected with the vertical plates 52, a plurality of uprights 53 are fixedly connected with the lower box body 1, a second cavity is provided in the uprights 53, a fourth through hole is provided on the top wall of the second cavity, a sphere 54 and a third spring 55 are placed in the second cavity, the sphere 54 extends out of the fourth through hole, the sphere 54 abuts against the third spring 55, a positioning groove is provided on the turntable 7, and the sphere 54 is clamped in the positioning groove.

The vertical plates 52 are used to support the worm 49, the sphere 54 is used to abut against the turntable 7, when the turntable 7 is rotated, the sphere 54 will move on the surface of the turntable 7, when the sphere 54 enters the positioning groove, the turntable 7 will be stuck to avoid rotating, and the sphere 54 can leave the positioning groove by rotating the turntable 7 forcefully.

In a further optimized solution, a plurality of partitions 56 are fixedly connected inside the lower box body 1, the interior of the lower box body 1 is divided into the clear water chamber 2, the motor chamber 3, the water pump 5 chamber and the power supply chamber through the partitions 56, clean water is placed in the clear water chamber 2, a power supply 57 is provided in the power supply 57 chamber, the motor 4 and the electric telescopic rod 16 are electrically connected with the power supply 57, a water adding hole is provided on the side wall of the clear water chamber, a water adding pipe 58 is fixedly connected inside the water adding hole, a second one-way valve is installed on the water adding pipe 58, a drainage pipe is provided in the clear water chamber, the drainage pipe extends out of the lower box body 1, the drainage pipe is detachably connected with the third flexible pipe 36, an upper plate 60 is fixedly connected with the top end of the support column 6, and a handle is fixedly connected with the upper plate 60.

The partitions 56 are used to separate the clear water chamber 2, the motor chamber 3, the water pump 5 chamber and the power supply 57 chamber, the clean water is used to flush the third flexible pipe 36, the water pump 5 and the first flexible pipe 14, when the sampling of a set of press filters is completed, the device is taken out from the water, the bottom shell 9 is taken from the turntable 7, then the third flexible pipe 36 is connected with the drainage pipe of the clear water chamber, then the water pump 5 is started to flush a pipeline, to prevent from affecting the next collection, and the water adding pipe 58 facilitates adding water to the clear water chamber.

The method for using the device is as follows: the device is put into the water in the target area, and then the device is put underwater; the water enters the filtering box 34, the interception net 35 filters the water for the first time, after starting the water pump 5, the water pump 5 delivers the water into the bottom shell 9 through the first flexible pipe 14, the filtering screen 30 and the filtering cotton 31 are provided in the bottom shell 9, and the filtering screen 30 and the filtering cotton 31 filter the water sample for the second time; the electric telescopic rod 16 is started and drives the push block 29 to move, when the push block 29 is in contact with the top block 27, the second slope of the push block 29 will be in contact with the first slope of the top block 27, the top block 27 will be jacked up as the movement of the push block 29, thus driving the push-pull rod 19 to move up, the fixed plate 24 also moves up to compress the first spring 25, when the push-pull rod 19 rises, the piston 18 rises, the gap between the piston 18 and the filtering membrane 15 becomes larger, and the water will enter between the piston 18 and the filtering membrane 15 through the second hard pipe 32, the second flexible pipe 33 and the first hard pipe 21; after the entry of the water, the electric telescopic rod 16 is retracted, the push block 29 is separated from the top block 27; and under the action of the first spring 25, the fixed plate 24 drives the push-pull rod 19 to move down, thus squeezing the sucked water, which can speed up the filtration of water by the filtering membrane 15. After the sampling of a set of press filter is completed, the device is taken out from the water, the bottom shell 9 is removed from the turntable 7, the worm 49 is rotated in the opposite direction, the worm 49 drives the turbine 48 to rotate, the turbine 48 drives the stud 47 to rotate, the movable plate 46 moves down, the second joint and the via holes 51 are disassembled, then the turntable 7 is rotated, and another set of press filter, cylinder 8 and bottom shell 9 is replaced.

In the description of the present invention, it is understood that orientation or position relationships indicated by the terms "longitudinal", "horizontal", "upper", "lower", "front", "rear", "left", "right", "vertical", "horizontal", "top", "bottom", "inner", "outer" and the like are based on the orientation or position relationships as shown in the drawings, for ease of describing the present invention only, rather than indicating or implying that the mentioned apparatus or element necessarily has a particular orientation and must be constructed and operated in the particular orientation. Therefore, these terms should not be understood as limitations to the present invention.

The above implementations are merely to describe the preferred implementations of the present invention, instead of limiting the scope of the present invention. Without departing from the design spirit of the present invention, various deformations and improvements made to the technical solution of the present invention by those of ordinary skill in the art shall all fall in the scope of protection determined by the claims of the present invention.

What is claimed is:

1. A water environmental DNA collection apparatus, comprising
    a lower box body (1), wherein a clear water chamber (2), a motor chamber (3), a water pump chamber and a power supply chamber are provided in the lower box body (1), a motor (4) is provided in the motor chamber (3), a water pump (5) is provided in the water pump chamber, the lower box body (1) is fixedly connected with a first filtering mechanism, the water pump (5) communicates with the first filtering mechanism, a support column (6) is fixedly connected outside the lower box body (1), and a turntable (7) is fixedly connected with the support column (6); and
    collection components, wherein a plurality of groups of collection components are provided, each collection component comprises a press filter, a cylinder (8) and a bottom shell (9), a transverse plate (10) is fixedly connected inside the cylinder (8), the cylinder (8) is divided into a filter pressing chamber (11) and a filtering chamber (12) through the transverse plate (10), a second filtering mechanism is provided in the bottom shell (9), the bottom shell (9) is detachably connected with the cylinder (8) and the turntable (7), a water inlet hole (13) is provided on the bottom shell (9), the water pump (5) communicates with the water inlet hole (13) through a first flexible pipe (14), the first flexible pipe (14) is detachably connected with the water inlet hole (13), the press filter is detachably connected with the cylinder (8) and communicates with the filtering chamber (12), a filtering membrane (15) is provided in the press filter, an electric telescopic rod (16) is fixedly connected with the support column (6), and the electric telescopic rod (16) is drivingly connected with the press filter;
    wherein the press filter comprises an inner cylinder (17), the inner cylinder (17) is detachably connected inside the cylinder (8) and located in the filter pressing chamber (11), a piston (18) is slidably connected inside the inner cylinder (17), a push-pull rod (19) is fixedly connected with the piston (18), a first groove is provided on the inner cylinder (17), the filtering membrane (15) is placed in the first groove, a pressure ring (20) is detachably connected with the first groove, the pressure ring (20) abuts against the filtering membrane (15), a first through hole is provided on the piston (18), a first hard pipe (21) is fixedly connected with the first through hole, a first one-way valve (61) is installed on the first hard pipe (21), the first hard pipe (21) communicates with a second flexible pipe (33), and the second flexible pipe (33) communicates with the filtering chamber (12);
    wherein a plurality of connecting rods (22) are fixedly connected inside the inner cylinder (17), a positioning ring (23) is fixedly connected with the connecting rods (22), the push-pull rod (19) is located in the positioning ring (23) and movably provided in the positioning ring (23), a fixed plate (24) is fixedly connected with the push-pull rod (19), a first spring (25) is provided between the fixed plate (24) and the positioning ring (23), the first spring (25) is worn on the push-pull rod (19), the filter pressing chamber (11) and the filtering chamber (12) are both provided with vents, and the vents are fixedly connected with air pipes (26);
    wherein a top block (27) is fixedly connected with the top end of the push-pull rod (19), the top block (27) is provided with a first slope, a supporting plate (28) is fixedly connected with the support column (6), a push block (29) is fixedly connected with the output end of the electric telescopic rod (16), the push block (29) is provided with a second slope, the push block (29) is slidably arranged on the supporting plate (28), and an avoidance groove is provided on the push block (29); wherein the second filtering mechanism comprises a filtering screen (30) and a filtering cotton (31), a second groove and a third groove are provided in the bottom shell (9), the filtering screen (30) and the filtering cotton (31) are both detachably connected inside the second groove, the filtering cotton (31) is located above the filtering screen (30), the side wall of the third groove is provided with threads, the outer edge of the cylinder (8) is provided with threads, the cylinder (8) is detachably connected with the third groove through the threads, a second through hole is provided on the side wall of the filtering chamber (12), a second hard pipe (32) is worn in the second through hole, the water inlet end of the second hard pipe (32) is located above the filtering cotton (31), and the second flexible pipe (33) is fixedly connected with the second hard pipe (32).

2. The water environmental DNA collection apparatus according to claim 1, wherein the first filtering mechanism comprises a filtering box (34), the filtering box (34) is fixedly connected with the lower box body (1), an interception net (35) is fixedly connected with the filtering box (34), a water outlet hole is provided on the filtering box (34), the water outlet hole communicates with the water pump (5) through a third flexible pipe (36), the third flexible pipe (36) is detachably connected with the water outlet hole, a rotating shaft (37) is fixedly connected with the output end of the motor (4), the rotating shaft (37) extends out of the lower box body (1), the rotating shaft (37) passes through the filtering box (34) and the interception net (35), a brush (38) is fixedly connected with the rotating shaft (37), and the brush (38) abuts against the interception net (35).

3. The water environmental DNA collection apparatus according to claim 1, wherein the turntable (7) is fixedly connected with an installation groove (39), the bottom shell (9) is detachably connected in the installation groove (39), a first cavity (40) is provided in the side wall of the installation groove (39), a third through hole is provided on the side wall of the first cavity (40), a clamping column (41) is worn in the third through hole and the first cavity (40), a baffle (42) is fixedly connected with the clamping column (41), the baffle (42) is in the first cavity (40), a second spring (43) is sleeved on the clamping column (41), the second spring (43) is located in the first cavity (40), one end of the second spring (43) abuts against the baffle (42), the other end of the second spring (43) abuts against the side wall of the first cavity (40), a clamping slot is provided on the bottom shell (9), the clamping column (41) is detachably connected with the clamping slot, and the end of the clamping column (41) that is away from the clamping slot is fixedly connected with a hand-pulled block (44).

4. The water environmental DNA collection apparatus according to claim 3, wherein a plurality of guide posts (45) are fixedly connected outside the lower box body (1), a movable plate (46) is slidably connected with the guide posts (45), a stud (47) is rotationally connected with the lower box body (1), threaded holes are provided on the movable plate (46), the stud (47) is worn in the threaded holes and movably disposed in the threaded holes, a turbine (48) is fixedly connected with the stud (47), a worm (49) is rotationally connected with the lower box body (1), the turbine (48) is engaged with the worm (49), a first joint (50) is fixedly connected with the movable plate (46), the first joint (50) communicates with the first flexible pipe (14), via holes (51) are provided on the installation groove (39) and the turntable (7), the water inlet hole (13) is fixedly connected with a second joint, the second joint is inserted into the via holes (51), and the first joint (50) is detachably connected with the via holes (51).

5. The water environmental DNA collection apparatus according to claim 4, wherein two vertical plates (52) are fixedly connected outside the lower box body (1), the worm (49) is rotationally connected with the vertical plates (52), a plurality of uprights (53) are fixedly connected with the lower box body (1), a second cavity is provided in the uprights (53), a fourth through hole is provided on the top wall of the second cavity, a sphere (54) and a third spring (55) are placed in the second cavity, the sphere (54) extends out of the fourth through hole, the sphere (54) abuts against the third spring (55), a positioning groove is provided on the turntable (7), and the sphere (54) is clamped in the positioning groove.

6. The water environmental DNA collection apparatus according to claim 2, wherein a plurality of partitions (56) are fixedly connected inside the lower box body (1), the interior of the lower box body (1) is divided into the clear water chamber (2), the motor chamber (3), the water pump chamber and the power supply chamber through the partitions (56), clean water is placed in the clear water chamber (2), a power supply (57) is provided in the power supply chamber, the motor (4) and the electric telescopic rod (16) are electrically connected with the power supply (57), a water adding hole is provided on the side wall of the clear water chamber, a water adding pipe (58) is fixedly connected inside the water adding hole, a second one-way valve is installed on the water adding pipe (58), a drainage pipe (59) is provided in the clear water chamber, the drainage pipe (59) extends out of the lower box body (1), the drainage pipe (59) is detachably connected with the third flexible pipe (36), an upper plate (60) is fixedly connected with the top end of the support column (6), and a handle is fixedly connected with the upper plate (60).

* * * * *